United States Patent [19]

Marcus

[11] 4,000,404
[45] Dec. 28, 1976

[54] VISOR ILLUMINATED MIRROR

[75] Inventor: Konrad H. Marcus, Holland, Mich.

[73] Assignee: Prince Corporation, Holland, Mich.

[22] Filed: July 14, 1975

[21] Appl. No.: 595,533

Related U.S. Application Data

[63] Continuation-in-part of Ser. No. 343,198, March 21, 1973, Pat. No. 3,926,470.

[52] U.S. Cl. .............................. 240/2 R; 240/4.2; 296/97 B; 296/97 H; 350/307
[51] Int. Cl.² ......................................... F21V 33/00
[58] Field of Search .......... 240/2 R, 4.2; 296/97 R, 296/97 B, 97 C, 97 H; 350/288, 307; 224/29 A; D12/191

[56] References Cited

UNITED STATES PATENTS

| | | |
|---|---|---|
| 2,123,319 | 7/1938 | Thompson ........................ 240/4.2 |
| 3,211,903 | 10/1965 | McElreath ........................ 240/4.2 |
| 3,375,364 | 3/1968 | Marcus ........................ 240/4.2 |
| 3,751,106 | 8/1973 | Mahler et al. ................ 296/97 H |
| 3,794,828 | 2/1974 | Arpino ........................ 240/4.2 |
| 3,871,703 | 3/1975 | Aceatino ..................... 296/97 H |

Primary Examiner—L. T. Hix
Assistant Examiner—J. A. LaBarre
Attorney, Agent, or Firm—Fisher, Gerhardt & Groh

[57] ABSTRACT

A visor assembly incorporating a visor having a built-in lighted vanity mirror which is illuminated in one embodiment by movement of a mirror cover and in another embodiment by movement of the visor from a storage position to an operative position. The lighting system serves to illuminate an object such as an observer or a map with a light intensity that can be varied manually.

16 Claims, 19 Drawing Figures

VISOR ILLUMINATED MIRROR

This is a continuation-in-part application of copending application Ser. No. 343,198 filed Mar. 21, 1973, now U.S. Pat. No. 3,926,470.

This invention relates to improvements in visors adapted although not exclusively for use with vehicles.

Vehicle visors customarily shield the front seat occupant's eyes from the sun light. Because of their eye level location these visors have been found to be a convenient place to locate a vanity mirror which is usually done either by clamps or by attaching the mirror to the visor with an appropriate adhesive material. With such a vanity mirror, there are problems such as lack of illumination, particularly at night. Because an uncovered mirror can provide undesired reflections, it is usually not located on the driver's visor.

With the foregoing in mind a new and different visor assembly is contemplated that includes a vanity mirror which is illuminated.

Further contemplated is a visor assembly having a lighted vanity mirror with a unique lighting system that utilizes electric conductors which serve multiple functions including that of illumination reflectors and that are easily connected to an existing power source.

More specifically contemplated is a visor assembly having a lighted vanity mirror wherein the illumination can be varied and wherein a lighting system is actuated by movement of a cover for the mirror or by movement of the visor from its storage position.

Another object is the provision of a visor assembly comprising novel structure whereby the visor includes a recess for housing a vanity mirror and a lighting system therefor.

Also an object is the provision of a padded visor assembly having a visor that has a one piece core which is molded of a plastic like material in two integral sections which fold upon themselves to form the one piece core with a flexible end and includes a recess for housing a vanity mirror and a lighting system therefor.

Other objects include the provision of a visor assembly having a lighted vanity mirror and a lighting system that distributes the illumination towards an observer or an object and that can also be used for reading purposes; and a visor assembly that provides vanity mirror illumination with a minimum number of parts.

The foregoing and other objects and advantages of the invention will become apparent from the following description and from the accompanying drawings in which:

FIG. 10 is a plan view of the core employed by the visor assembly shown prior to being folded;

FIG. 11 is a view taken along lines 11—11 of FIG. 10;

FIGS. 12 and 13 are views of the FIG. 10 core shown looking in the direction respectively of arrows 12—12 and 13—13 in FIG. 10;

Figure 1:
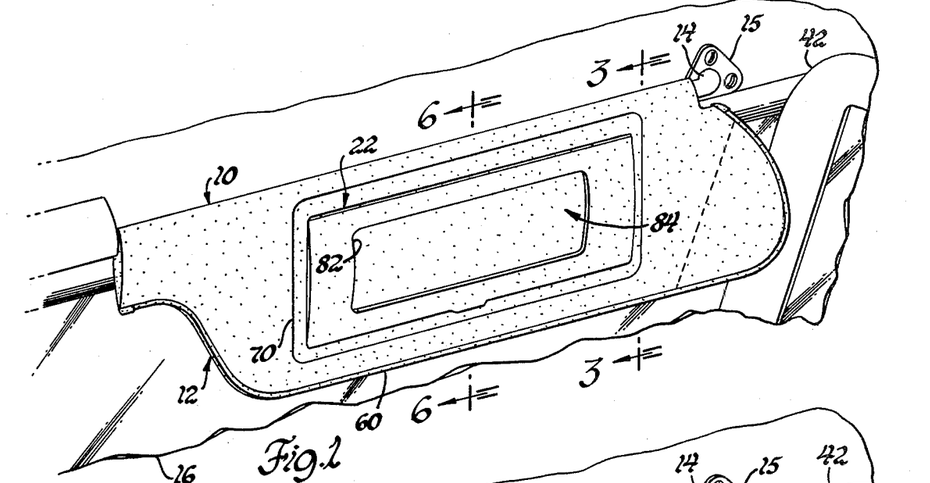
FIG. 1 is a perspective view of a visor assembly depicting a lighted vanity mirror with a cover in the closed position.
Figure 2:
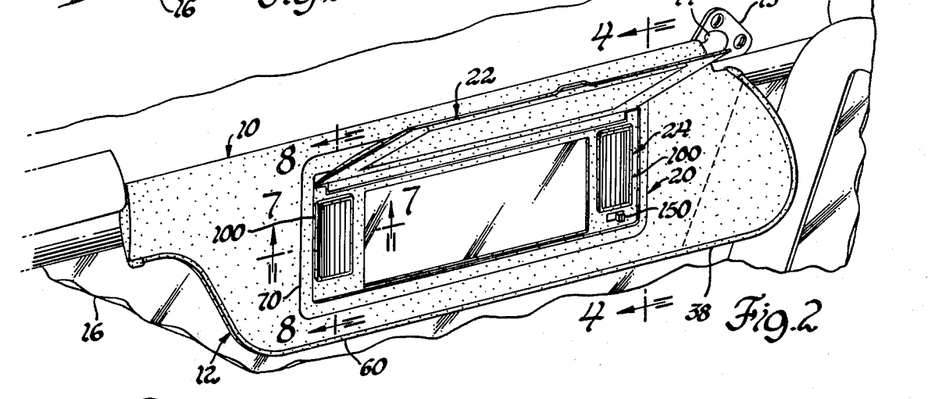
FIG. 2 is another perspective view of the FIG. 1 visor assembly with the mirror cover shown in the open position.

Referring first to FIGS. 1 and 2, the visor assembly incorporating the principles of the invention is denoted generally by the numeral 10 and is shown for demonstration purposes installed on the passenger's side of a vehicle although it could be installed on the driver's side or both. The visor assembly 10 includes a visor 12 that is swingably supported on a rod 14. This rod 14 has a swivel attachment 15 that is connected to the vehicle just above the vehicle windshield 16. The visor 12 can, at its end opposite the swivel attachment 15, include an end rod 17, which can be releasably supported by a bracket 18. Thus, in the usual way the visor 12 can be removed from the depicted position which affords light reflection from the windshield 16 to a stored position above the windshield 16 or swung sidewise, if desired, so as to provide a sunshield against light from the side. The visor assembly 10 further includes a vanity mirror 20, a vanity mirror cover 22, which is swingable between the FIG. 1 closed position and the FIG. 2 open position with respect to the vanity mirror 20 and a lighting system 24 for the vanity mirror 20. When the visor assembly 10 is in the FIG. 1 position, the vanity mirror cover 22 can be removed to the FIG. 2 open position so as to expose the vanity mirror 20 and also to actuate the lighting system 24 so as to illuminate the mirror 20.

Figure 6:
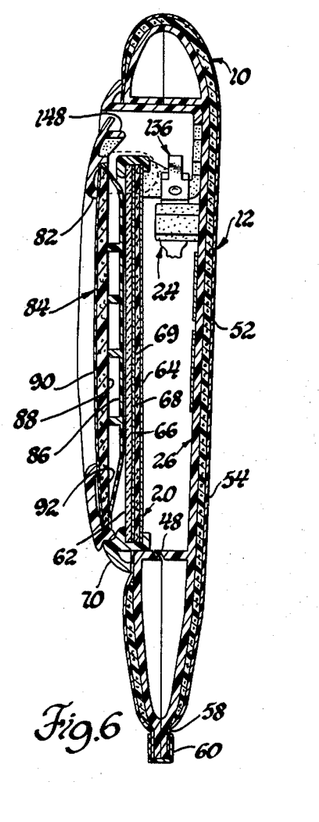
FIG. 6 is a sectional view of the visor assembly taken along line 6—6 in FIG. 1.
Figure 14:
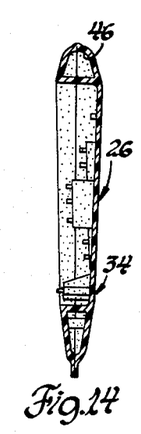
FIG. 14 is a sectional view of the FIG. 10 core taken along line 14—14 in FIG. 10.

As best observed in FIG. 10, the visor 12 has a core 26 formed of a suitable material such as plastic; e.g., polypropylene or the equivalent. The core 26 is molded in one piece with the viewed rib structure comprising a series of ribs 28. These ribs 28 afford strength while minimizing the amount of plastic like material required. This core 26 has an open section 30 with a rectangular shaped through opening at 32 and a face section 34 provided with a face 36 of the same rectangular shape as the opening 32 and a flexible end 38 that is connected to the face section 34 by a so called live hinge 40. The hinge 40 is formed by reducing the cross-sectional area at this point so that the flexible end 38 can deflect, when the visor assembly 10 is in its stored position against the vehicle ceiling and cover a corner 42 viewed in FIG. 1 for safety purposes. The two sections 30 and 34 also have a similar "live" hinge at 44 that permits the two sections to be folded onto themselves as seen in FIG. 6. Additionally, the face section 34 includes a channel 46, best viewed in FIG. 14, for reception of the rod 14. The two sections 30 and 34 can be held together by any suitable interlocking provision; for instance, that depicted in FIG. 6 at 48 or by pins or both. When the two sections 30 are folded together, they provide a recess 50 defined by the opening 32 and the face 36. This recess 50 accommodates the vanity mirror 20 and the lighting system 24 as will be explained.

Figure 5:
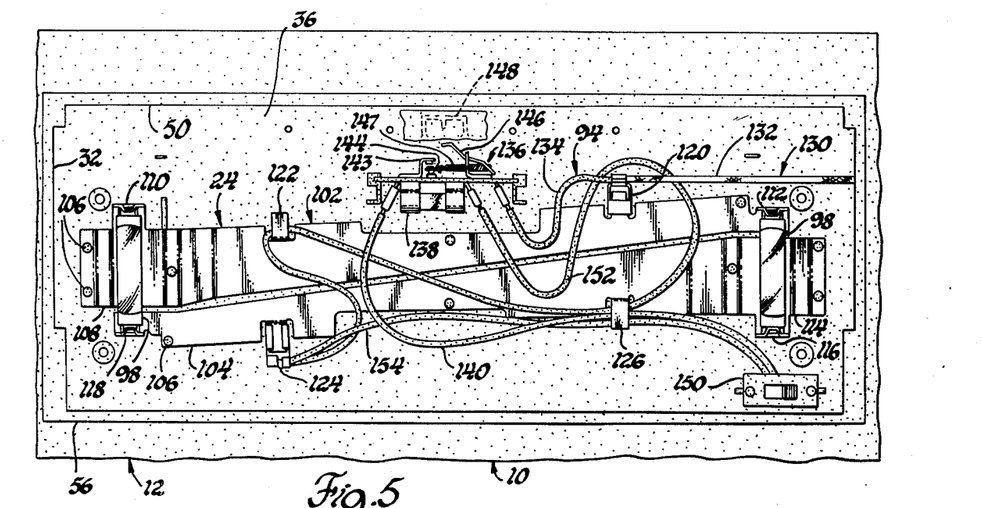
FIG. 5 is a view of the visor assembly with the vanity mirror removed so as to show the lighting system therefor.

As seen in FIG. 6, the core 26 has placed over it a padding 52 of any suitable material, such as Scott's No. 250 dielectric foam and then a covering 54 of some suitable material, such as cloth, leather, vinyl or the like. This covering 54 is cut to a shape that conforms to the contour of the core 26 and then, as observed in FIG. 5, is sealed around the recess 50 and in the area denoted generally by the numeral 56 in any suitable way such as by an adhesive material or by heat sealing; e.g., dielectric heating. In the same way the covering 54 can be sealed at its ends around the perimeter of the visor 12 at 58 after which a binding 60 is stitched or heat sealed to the perimeter 58. If preferred, the dielectric heating process can be used to provide embossing that will simulate the stitching.

As shown in FIG. 6, the vanity mirror 20 comprises a glass panel 62 which can be drawn window glass and a steel backing plate 64. The glass panel 62 has the customary reflective coating on its back surface 66. The attachment of the glass panel 62 to the steel backing plate 64 is made by an appropriate adhesive backing strip shown generally at 68. This strip 68 comprises, by way of example and without limitation, a polyvinyl chloride material of approximately 4 or 5 mills thickness, which is applied to both the glass panel back surface 66 and an opposite surface 69 on the steel backing plate 64 and an intermediate polyurethane foam material or the equivalent having a thickness of approximately 0.010 to 0.030 ins. With this construction, if the vanity mirror 20 is struck with a blow of sufficient magnitude to break the glass panel 62, the steel backing plate 64 will deflect and bend so as to absorb the impact and due to what might be called a "pipe bender effect," any broken glass particles which would otherwise fly-off the mirror face are retained in position relative to the backing plate 64 by the strip 68.

For supporting the vanity mirror 20 on the visor 12, a frame 70 is provided which fits within the visor recess 50 in such a way as to be releasably retained therein. This frame 70 can either be made of a metallic material or a nonmetallic material; for instance, a suitable molded plastic material.

The vanity mirror 20 fits on each of its sides within channels 71 in the frame 70 and is retained in position by clamping edges 72, which are bent at installation to the depicted position.

Figure 3:
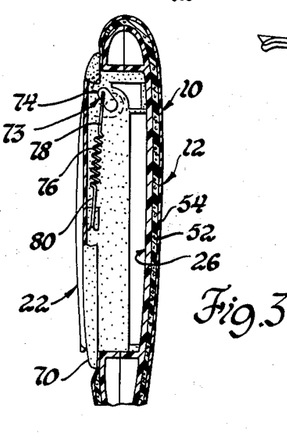
FIG. 3 is a sectional view of the visor assembly taken along line 3—3 in FIG. 1.
Figure 4:
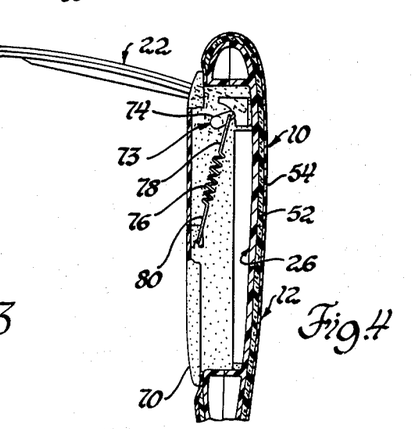
FIG. 4 is a sectional view of the visor assembly taken along line 4—4 in FIG. 2.

The frame 70 also supports the vanity mirror cover 22 which is pivotally connected thereto by hinge connections 73 at each end of the cover 22. For holding the cover 22 in the FIG. 2 position and also in the FIG. 1 closed position, each hinge connection 73 is provided with an offset arm 74 that pivots with the cover 22 and a spring 76 which has its opposite ends 78 and 80 respectively connected to the offset arm 74 and the frame 70 such that the tension of the spring 76, as best observed in FIGS. 3 and 4, holds the cover 22 in its closed and open depicted positions.

The cover 22 is constructed so as to have a rectangular shaped opening 82 therein for exposing a padded assembly 84 comprising a backing member 86 having the general shape of the opening 82, a padded strip 88, and a cover 90. The padded strip 88 and the cover 90 can be made of the same materials as the padding 52 and the covering 54 and the backing member 86 can be made of the same material as the core 26. The padded assembly 84 is larger than the rectangular shaped opening 82 so as to provide an overlap 92 around the perimeter thereof which overlap 92 can have applied thereto an appropriate adhesive material so as to retain the padded assembly 84 in place on the cover 22. One should be mindful that the entire cover 22 could be padded and covered if preferred in a way similar to that described with respect to the core 26.

The lighting system 24 comprises circuitry 94, which is positioned within the visor recess 50 and joined to the visor face 36, a pair of lamps 98, and a pair of lens 100. The lens 100 are releasably supported in complementary openings located in the vanity mirror frame 70 on each side of the vanity mirror 20. The lens 100 are each constructed so as to direct the light towards the center of the mirror 20 to provide greater concentration of illumination and also are constructed to prevent the illumination from straying and producing undesired reflections.

The circuitry 94 includes a ground conductor 102 and a power conductor 104, both of which are joined to the face 36 by a series of plastic plugs 106 upstanding from the face 36 so that the two conductors 102 and 104 are aligned as shown in FIG. 5. These conductors 102 and 104 are formed of a thin metallic material, such as a stainless steel sheet having relatively good current conducting characteristics. The ground conductor 102 has a reflector 108 provided at one end along with a contact 110 and at the other end a contact 112. The power conductor 104 likewise has a reflector 114 and a contact 116 at one end and a contact 118 at the opposite end. The ground conductor 102 has a terminal 120 and a conductor retaining hook 122 whereas the power conductor 104 has a terminal 124 and a conductor retaining hook 126. The pair of lamps 98 are installed opposite the reflectors 108 and 114 with one of the lamps 98 being connected between the contacts 110 and 118 and the other of the lamps 98 being connected between the contacts 112 and 116. These conductors 102 and 104 not only transfer current, but reflect light, deflect heat, serve as a heat sink and additionally, support the various other conductors employed by the circuitry 94, and thus, eliminate a substantial number of parts.

The circuitry 94 provides for the selective supply of power thereto from a conventional vehicle battery 128 (see FIG. 9) or the like by way of a coaxial cable shown generally at 130 which extends through the interior of the swivel attachment 15 and to the recess 50. The coaxial cable 130 comprises an outer conductor 132 formed of a conductive material, such as a braided metallic sheath, that is appropriately grounded and also connected to the ground conductor terminal 120 and an inner input conductor 134 that is coupled both to a connector 135, which is in turn connected to the battery 128, and to a selector switch 136. The selector switch 136, which provides for the selectivity, is coupled to a fuse 138 and an intermediate conductor 140 and to the terminal 124 of the power conductor 104. The conductor 140 is maintained in place by looping it around the hook 126 on the ground conductor 104 during installation. A resistance 143 may be installed between the battery 128 and the connector 135 for voltage control if desired.

The selector switch 136 comprises a fixed contact 143 which is coupled to the fuse 138, a movable contact 144 which is connected to the inner input conductor 134, and a cover actuated arm 146 which moves the movable contact 144 against the bias from a spring 147 to a closed position with respect to the fixed contact 142. To actuate the arm 146 the vanity mirror cover 22 is provided, as best viewed in FIGS. 5 and 6, with an extension 148, which urges the arm 146 downwardly as the cover 22 is moved to the open position. In this way the movable contact 144 is urged into engagement with the fixed contact 142 to complete the circuit from the battery 128 through the lamps 98 and provide the desired illumination.

For altering the intensity of the illumination from the lamps 98, the lighting system 24 further includes a light intensity varying provision including a dimmer switch 150, which is supported on the core face 36 and extends through a complementary opening in the vanity mirror frame 70, and a resistance conductor 152 which extends between the cover actuated selector switch 136 and the fuse 138 and the power conductor terminal 124 and shunt conductor 154, which extend from the dimmer switch 150 to the power conductor terminal 124. Both of the conductors 152 and 154 are retained in place by the hook 126 on the power conductor 104 whereas the conductor 152 is also retained in place by the hook 122 on the ground conductor. The resistance conductor 152 is of the well known type selected for the required resistance for illumination dimming purposes. This can best be explained by referring to the schematic circuit diagram in FIG. 9 for when the dimmer switch 150 is in the illustrated low position, the current flow is through the resistance conductor 152. Thus, the current flow is reduced and accordingly the energization of the lamps 98 so that the illumination is reduced. When the dimmer switch 150 is moved to the broken line high position in FIG. 9, the resistance conductor 152 is in effect shunted so that there is no reduction in the energization of the lamps 98 and accordingly they will provide the greatest illumination.

Figure 7:
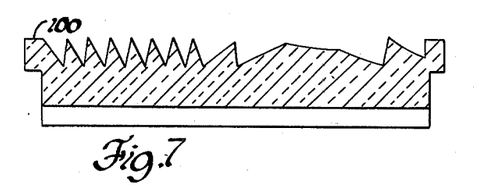
FIGS. 7 & 8 are sectional views taken respectively along the lines 7—7 and 8—8 in FIG. 2 of the lighting system lens.
Figure 8:
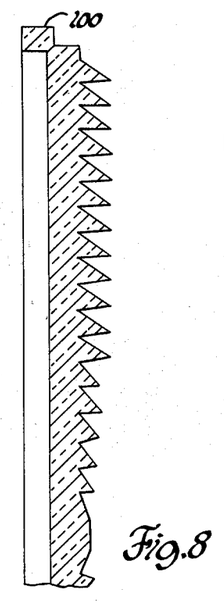

As viewed in FIGS. 7 and 8, the pair of lens 100 have a cross-sectional construction such that the illumination from the lamps 98 is directed towards the center of the mirror 20; i.e., towards an observer or an object to insure that the illumination does not stray or cause undesired lighting effects that might create a problem for the driver while still permitting one to use the vanity mirror.

In operation with the visor assembly 10 in its FIG. 1 position and the cover 22 closed, the visor assembly 10 and the cover being both padded provide an impact absorbing surface. When the vanity mirror 20 is to be used, the cover 22 is moved to the FIG. 2 open position which is approximately 120° from the plane of the visor 12. In moving to the open position, the cover extension 148 will actuate the selector switch 136 so as to activate the lighting system 24. The circuitry 94 will be completed to provide a current path from the battery 128 through the resistance 143, the connector 135, the coaxial cable inner input conductor 134, the selector switch 136 and then enter through the fuse 138 and the resistance conductor 152 or the intermediate conductor 140, determined by the position of the dimmer switch 150, through the power conductor 104, the lamps 98, the ground conductor 102, the coaxial cable outer conductor 132 and then via ground back to the battery 128. Hence, both of the lamps 98 will be energized whereupon the illumination will be directed or deflected by the two lens 100 towards the center of the mirror 20; i.e., towards an observer or an object so that the vanity mirror 20 can be used. If the illumination is greater than desired, the dimmer switch 150 can be moved to the solid line position in FIG. 9. It should be noted that by tilting the visor assembly 10 approximately 45° from the vertical that the visor assembly 10 can now be used as a general purpose lamp; e.g., as a map light or for reading.

Figure 9:
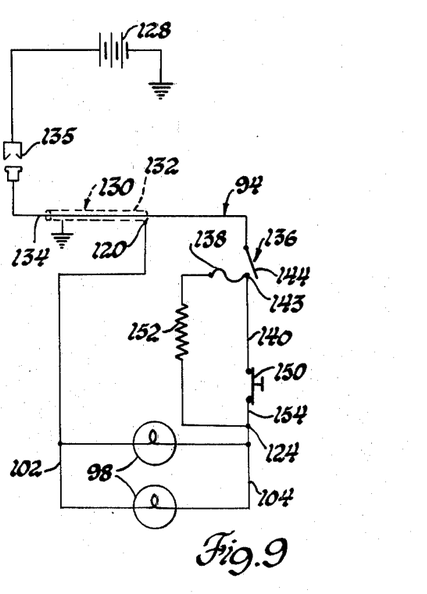
FIG. 9 is a schematic diagram of the lighting system circuitry.
Figure 13:
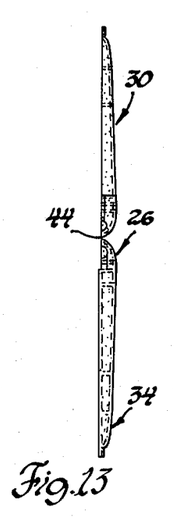
Figure 15:
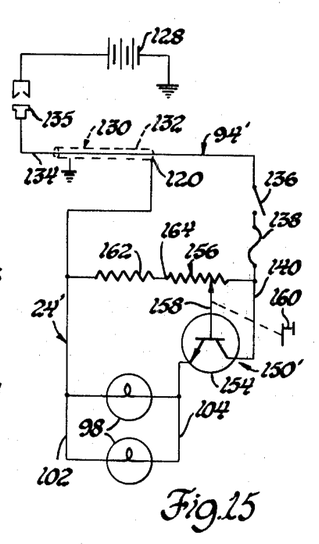
FIG. 15 is a schematic diagram of a modification of the lighting system circuitry.

In FIG. 15 a modification of the FIG. 9 lighting system 24 is displayed. In FIG. 15 like parts are assigned the same numbers and similar parts the same numbers with a prime (') added. Hence, the numerals 24' and 94' respectively denote a lighting system and circuitry. The FIG. 15 light intensity vary provision includes a dimmer switch 150', such as an NPN transistor 154, and a variable resistor 156 having an adjustable tap 158 that is movable by a manually movable dimmer element 160, as those versed in the art will appreciate a PNP type transistor can be employed if the appropriate polarity changes are made. The transistor 154 has its emitter connected to the power conductor 104, its collector connected to the intermediate conductor 140 and its base coupled to the adjustable tap 158. The lighting system 24' further includes a fixed resistor 162 in series with the variable resistor 156.

In operation, the lighting system 24' accomplishes the same function as its couterpart in the FIG. 9 embodiment. When the selector switch 136 is closed, a circuit is completed from the battery 128 to the transistor 154. The bias of the transistor 154 is varied manually by the dimmer element 160 such that if the tap 158 is moved by the dimmer element 160 towards the contact 164, the forward bias is decreased so as to decrease conduction by the transistor 154, and accordingly, the current supplied to the lamps 98. Therefore, the illumination from the lamps 98 will be reduced. To increase the illumination from the lamps 98, the dimmer element 160 is adjusted so as to, in turn, move the tap 158 away from the contact 164 and thus, increase the forward bias on the transistor 154 so as to increase its conduction and correspondingly the current flow through these lamps 98. This will increase the illumination from the lamps 98.

From the foregoing it will be appreciated that because of the construction of the mirror 20, if the mirror 20 is struck, the glass panel 62 can shatter but with a minimum of dispersion of the shattered particles from the panel 62. Furthermore, the visor assembly 10 affords a lighted vanity mirror 20 that is only uncovered when it is to be used. Also the visor assembly 10 is particularly suited for mass production. One should be mindful too, that the construction permits versatility in selection of colors for different parts of the visor assembly 10.

FIGS. 16 through 19 show a modification of the visor assembly which is designated generally by the reference character 170. The visor assembly 170 is generally similar to visor assembly 10 with the exception that it is not provided with a cover and the lighting system circuitry has been modified.

Figure 16:
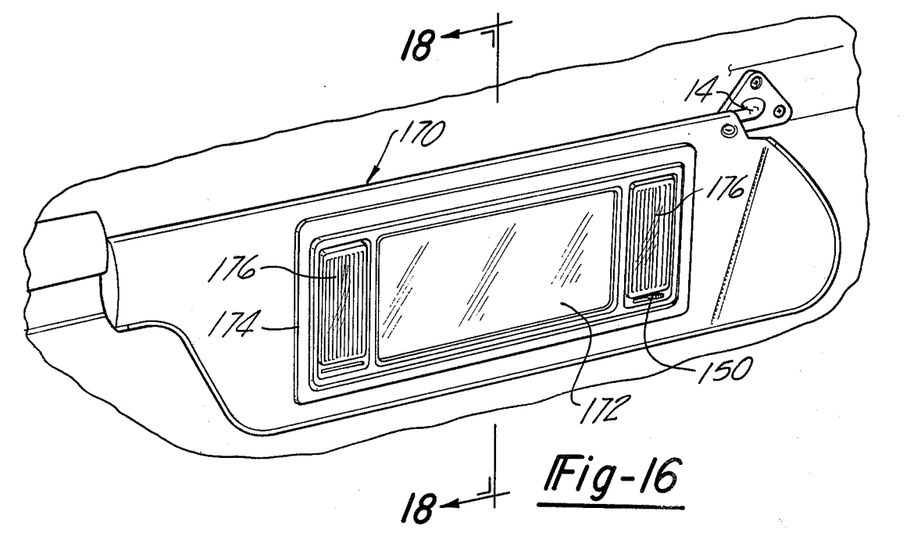
FIG. 16 is a perspective view of a visor assembly showing a modified form of the invention.
Figure 17:
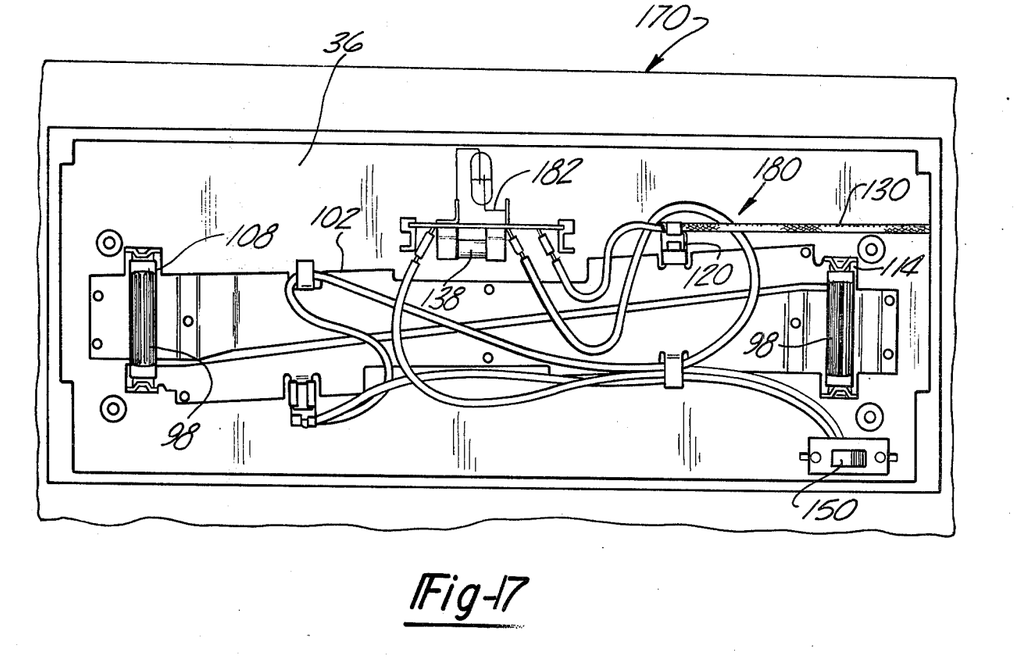
FIG. 17 is a view of the visor assembly with the vanity mirror removed to show the lighting system.
Figures 18, 19:
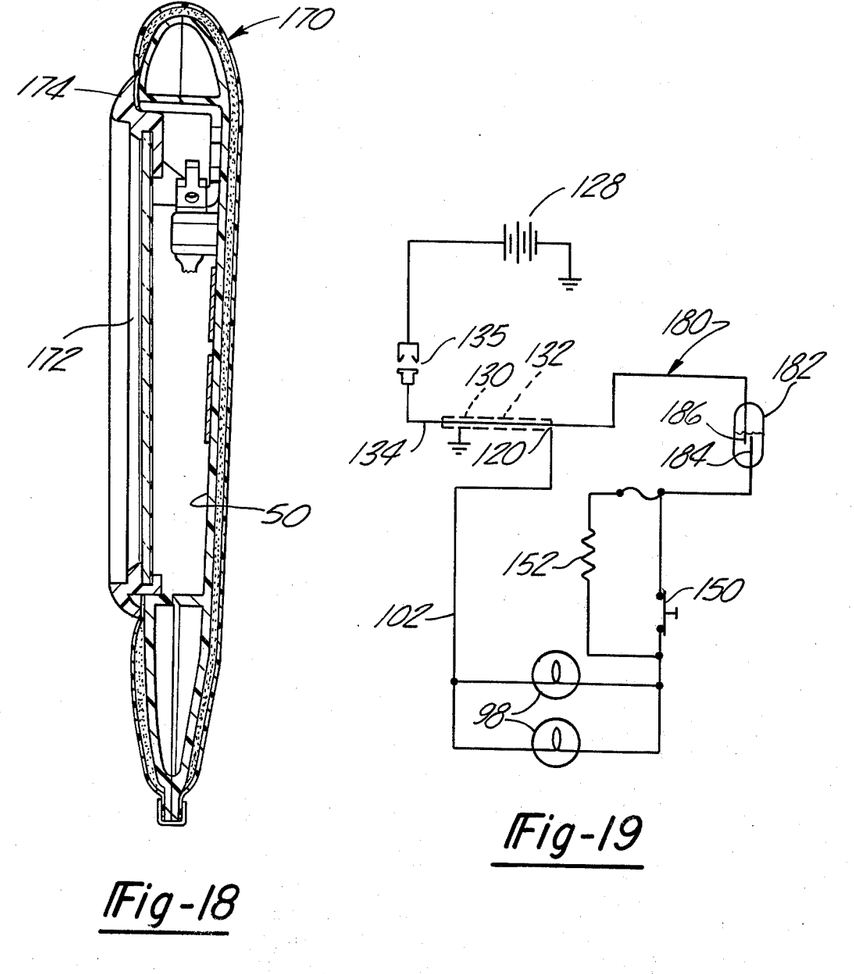
FIG. 18 is a sectional view taken generally along the lines 18—18 in FIG. 16.
FIG. 19 is a schematic diagram of the lighting system circuitry of the modified form of the invention shown in FIGS. 16, 17 and 18.
Figure 20:
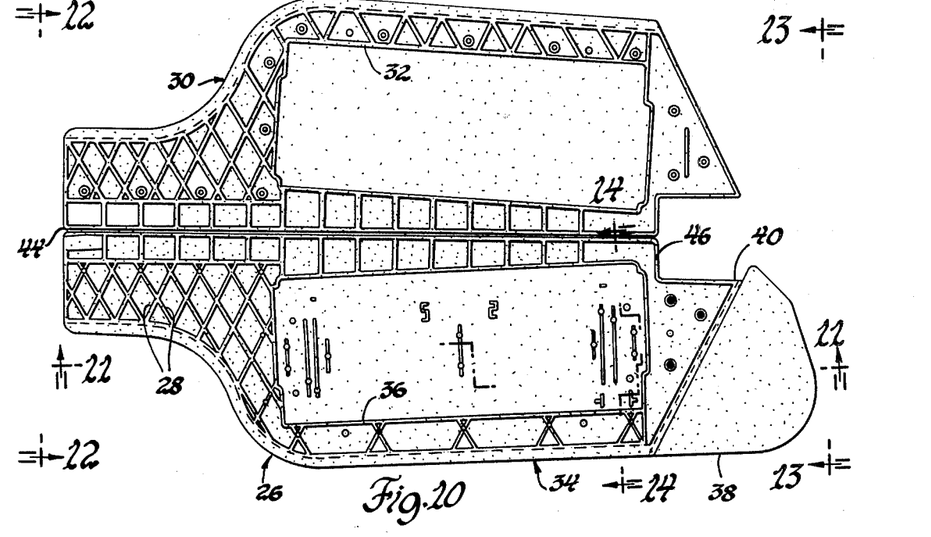
Figure 22:
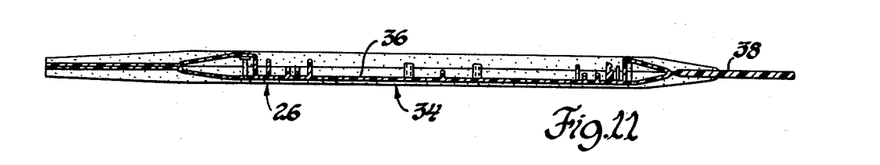

The visor assembly 170 includes the visor 12 which has a recess 50 to receive a vanity mirror 172 which can be constructed in the manner of the prior embodiment. The mirror 172 is provided with a frame 174 molded of plastic material or the like and releasably retained in the recess 50 in the same manner as the mirror frame 70.

The mirror frame 174 supports a pair of lenses 176 which are releasably supported in complementary openings at opposite sides of the mirror 172. With the mirror 172 and and mirror frame 174 in position relative to the visor 12, the lenses 176 are disposed in alignment with the reflectors 108 and 114 forming a part of the circuitry 180 which like the circuitry 94 of the prior embodiments is positioned within the visor recess 50 and is joined to the visor face 36 to illuminate the pair of lamps 98. The circuitry 180 is identical with the circuitry 94 with the exception that a mercury switch 182 is used instead of a selector switch 136 of the type shown in FIGS. 9 and 15.

The mercury switch 182 is provided with a pair of contacts 184 and 186 disposed within a switch capsule 188 so that when the visor assembly 170 is disposed in its storage position in a vehicle, the mercury 189 is out of contact with the terminals. When the visor is moved approximately 90° on its support rod 14 from its storage position in which it is generally horizontal to the roof of the vehicle, to a position in which the visor lies in a generally vertical plane, as shown in the drawings, the mercury 189 will emerse both of the contacts 184 and 186 to close the mercury switch 182. This completes the circuit from the input conductor 134 to the ground conductor 102 to illuminate the lamps 98 and afford light for the mirror 172.

If desired, the circuitry 180 may be generally similar to the circuitry 94' shown in FIG. 15 except that a mercury switch 182 is substituted for the selector switch 136. In either instance the circuitry 180 provides for illumination of the lamps 98 when the visor 12 is moved from a transport position to a generally vertical position in which the mirror is exposed and illuminated for use and a dimmer switch 150 as shown in FIG. 19 or a dimmer element 160 as shown in FIG. 15 may be used to vary the illumination on the mirror.

A visor assembly has been provided in which a vanity mirror on a visor is conditioned for illumination upon movement of the visor from its inoperative transport position in which the visor is disposed in a generally horizontal plane to an operative position in which the visor is disposed in a generally vertical plane. In one embodiment the mirror becomes illuminated upon swinging a cover over the mirror to a position exposing the mirror to view and in another embodiment the mirror is illuminated in response to movement of the visor from its transport position.

The embodiments of the invention in which an exclusive property or privilege is claimed are defined as follows:

1. A visor assembly for a vehicle or the like comprising a visor adapted for movement from a storage position in which said visor is disposed in an approximately horizontal plane to an operative position in which said visor is disposed in a approximately vertical plane, said visor forming a recess therein, a vanity mirror supported within said recess, said visor including a plastic like core constructed and formed in one piece and arranged to fold on itself so as to define a certain contour having a recess therein, a covering for the core, padding positioned between the covering and the core, the covering having the edges thereof heat sealed together around the periphery of the core and also heat sealed to the core around the recess, and a binding joined to the sealed together edges of the covering and wherein the vanity mirror is aligned with the recess.

2. A visor assembly for a vehicle or the like comprising a visor adapted for movement from a storage position in which said visor is disposed in an approximately horizontal plane to an operative position in which said visor is disposed in an approximately vertical plane, a mirror supported by said visor, lighting means carried by the visor and operative to illuminate the mirror, the lighting means including switch means actuated by movement of the visor so that when moved to the operative position the lighting means is rendered operative, said lighting means including lamp means, a power source and circuit means selectively coupling the lamp means to the power source, said circuit means including a pair of elongated conductors mounted on the visor, said lamp means including a pair of lamps spaced apart with each lamp in electrical contact with both of the pair of elongated conductors, said pair of elongated conductors each being formed of a relatively thin metallic strip having at one end thereof both a light reflecting and heat dissipating surface and a first lamp contact and at the other end thereof a second lamp contact, said conductors being so aligned that the first and second contacts on one of the pair of elongated conductors are respectively adjacent the first and second contacts on the other of the pair of elongated conductors, and the pair of lamps are each arranged adjacent the light reflecting and heat dissipating surface on the respective one of the pair of elongated conductors so as to be electrically coupled between the adjacent first and second contacts.

3. A visor assembly for a vehicle or the like as described in claim 2, wherein the circuit means includes coaxial cable means arranged to be electrically coupled between the pair of elongated conductors and the power source and including an outer conductor connected to one of the pair of elongated conductors and an inner conductor and selector switch means selectively actuatable to couple the inner conductor to the other of the pair of elongated conductors so as to complete a circuit for energizing the lamps.

4. A visor assembly for a vehicle or the like as described in claim 3 in which said switch means is actuated in response to movement of said visor from said storage to said operative position.

5. A visor assembly for a vehicle or the like as described in claim 4 in which said switch means is a mercury switch.

6. A visor assembly for a vehicle or the like as described in claim 3 wherein the lighting means further includes dimmer means comprising a resistance and a dimmer switch manually operable to selectively connect the resistance in circuit with the pair of lamps so as to alter the light intensity therefrom.

7. A visor assembly for a vehicle or the like as described in claim 3, wherein the lighting means further includes selectively operable dimmer means comprising variable resistance means and a semi-conductor switching device in circuit with the variable resistance means and the pair of lamps, the variable resistance means being selectively operable to vary the bias on the semi-conductor switching device and accordingly the conduction thereof and the light intensity of the pair of lamps.

8. A visor assembly for a vehicle or the like comprising a visor adapted for movement from a storage position in which said visor is disposed in an approximately horizontal plane to an operative position in which said visor is disposed in an approximately vertical plane, a mirror supported by said visor, lighting means carried by the visor and operative to illuminate the mirror, the lighting means including switch means actuated by movement of the visor so that when moved to the operative position the lighting means is rendered operative, said lighting means including lamp means, a power source and circuit means selectively coupling the lamp means to the power source, said visor including a recess, the vanity mirror including a frame removably positioned within the recess, the circuit means including a pair of elongated conductors mounted on the visor within the recess so that each extends to opposite ends thereof, the lamp means including a pair of lamps spaced apart at opposite ends of the recess with each lamp in electrical contact with both of the pair of elongated conductors, and the lighting means further including a pair of lenses, each lens being arranged opposite a respective one of the pairs of lamps and releasably supported by the frame so as to direct the illumination towards the vanity mirror.

9. A visor assembly for a vehicle or the like comprising a visor adapted for movement from a storage position in which said visor is disposed in an approximately horizontal plane to an operative position in which said visor is disposed in an approximately vertical plane, a mirror supported by said visor, lighting means carried by the visor and operative to illuminate the mirror, the lighting means including switch means actuated by movement of the visor so that when moved to the operative position the lighting means is rendered operative, said lighting means including lamp means, a power source and circuit means selectively coupling the lamp means to the power source, said visor including a plastic like core constructed and formed in one piece and arranged to fold on itself so as to define a certain contour having a recess therein, a covering for the core, padding between the covering and the core, the covering having the edges thereof sealed together around the periphery of the core and also joined to the core around the recess, a binding joined to the peripheral edges of the covering, and the vanity mirror including a frame movable positioned within the recess.

10. A visor assembly for a vehicle or the like as described in claim 9, wherein the circuit means includes a pair of elongated conductors mounted on the visor within the recess so that each extends to opposite ends thereof, the lamp means includes a pair of lamps spaced apart at opposite ends of the recess with each lamp in electrical contact with both of the conductors, and the lighting means further includes a pair of lens, each lens being arranged opposite the respective one of the pair of lamps and releasably supported by the frame so as to direct the illumination towards an observer or an object.

11. A visor assembly for a vehicle or the like as described in claim 10, wherein the pair of elongated conductors are each formed of a relatively thin metallic strip, having at one end thereof both a light reflecting and heat dissipating surface and a first lamp contact and at the other end thereof a second lamp contact and are each so aligned that the first and second lamp contacts on one of the pair of elongated conductors are respectively adjacent the second and first contacts on the other of the pair of elongated conductors, the pair of lamps are each arranged adjacent the light reflecting and heat dissipating surface on a respective one of the pair of elongated conductors so as to be electrically coupled between the corresponding adjacent first and second contacts, and the circuit means includes coaxial cable means arranged to be electrically coupled between the pair of elongated conductors and the power source and switch means selectively operable by movement of the visor so that the vanity mirror cover when moved to the operative position thereof to couple the pair of elongated conductors to the power source so as to energize each of the lamps.

12. A visor assembly for a vehicle or the like as described in claim 11, wherein the lighting means further includes dimmer means having a resistance and a selectively operable dimmer switch manually operable to selectively connect the resistance in circuit with the pair of lamps so as to alter the light intensity therefrom.

13. A visor assembly for a vehicle comprising a visor adapted for movement from a storage position in which said visor is disposed in an approximately horizontal plane to an operative position in which said visor is disposed in an approximately vertical plane, said visor forming a recess therein, a vanity mirror supported within said recess, lighting means having lamp means, a power source and circuit means, the lighting means including selectively operable dimmer means comprising resistance means and dimmer switch means cooperable with the resistance means to alter the resistance in circuit with the lamp means so as to vary the light intensity therefrom, said lighting means further including selectively operable dimmer means having variable resistance means and a transistor switch in circuit therewith and with the pair of lamps, the variable resistance means being selectively operable to vary conduction by the transistor switch and accordingly the light intensity of the pair of lamps.

14. A visor assembly for a vehicle or the like comprising a visor adapted for movement from a storage position in which said visor is disposed in an approximately horizontal plane to an operative position in which said visor is disposed in an approximately vertical plane, a mirror supported by said visor, lighting means carried by the visor and operative to illuminate the mirror, the lighting means including switch means operative to render the lighting means operative upon movement of the switch means to an operative position, said lighting means including lamp means, a power source and circuit means selectively coupling the lamp means to the power source, said circuit means including a pair of elongated conductors mounted on the visor, said lamp means including a pair of lamps spaced apart with each lamp in electrical contact with both of the pair of elongated conductors, said pair of elongated conductors each being formed of a relatively thin metallic strip having at one end thereof both a light reflecting and heat dissipating surface and a first lamp contact and at the other end thereof a second lamp contact, said conductors being so aligned that the first and second contacts on one of the pair of elongated conductors are respectively adjacent the first and second contacts on the other of the pair of elongated conductors, and a pair of lamps are each arranged adjacent the light reflecting and heat dissipating surface on the respective one of the pair of elongated conductors so as to be electrically coupled between the adjacent first and second contacts.

15. A visor assembly for a vehicle or the like comprising a visor adapted for movement from a storage position in which said visor is disposed in an approximately horizontal plane to an operative position in which said visor is disposed in an approximately vertical plane, a mirror supported by said visor, lighting carried by the visor and operative to illuminate the mirror, the lighting means including switch means which when actuated to an operative position renders the lighting means operative, said lighting means including lamp means, a power source and circuit means selectively coupling the lamp means to the power source, said circuit means including a pair of elongated conductors mounted relative to the visor so as to extend to opposite ends of said mirror, the lamp means including a pair of lamps spaced apart at opposite ends of the visor with each lamp in electrical contact with both of the pair of elongated conductors, and the lighting means further including a pair of lenses, each lens being arranged opposite a respective one of the pairs of lamps and releasably supported relative to said visor to direct the illumination towards the mirror.

16. A visor assembly for a vehicle or the like comprising a visor adapted for movement from a storage position in which said visor is disposed in an approximately horizontal plane to an operative position in which said visor is disposed in an approximately vertical plane, a mirror supported by said visor, lighting means carried by the visor in operative position to illuminate the mirror, the lighting means including switch means actuated by movement of the visor so that when moved to the operative position the lighting means is rendered operative, said lighting means including lamp means, a power source and circuit means selectively coupling the lamp means to the power source, the mirror including a frame positioned on the visor, the circuit means including a pair of elongated conductors mounted relative to the visor so that each extends to opposite ends thereof, the lamp means including a pair of lamps spaced apart at opposite ends of the visor with each lamp in electrical contact with both of the pair of elongated conductors, and the lighting means further including a pair of lenses, each lens being arranged opposite a respective one of the pair of lamps and supported by the frame so as to direct the illumination towards the mirror.

* * * * *